(12) United States Patent
Broussard et al.

(10) Patent No.: US 12,055,389 B2
(45) Date of Patent: Aug. 6, 2024

(54) PIPE PIN END WITH AXIAL EXTENSION

(71) Applicant: FERMATA TECHNOLOGIES, LLC, Houston, TX (US)

(72) Inventors: Ryan Michel Broussard, Denver, CO (US); Rahul Shyam Deshpande, Katy, TX (US)

(73) Assignee: FERMATA TECHNOLOGIES, LLC, Houston, TX (US)

( * ) Notice: Subject to any disclaimer, the term of this patent is extended or adjusted under 35 U.S.C. 154(b) by 582 days.

(21) Appl. No.: 17/482,777

(22) Filed: Sep. 23, 2021

(65) Prior Publication Data

US 2022/0090902 A1 Mar. 24, 2022

Related U.S. Application Data

(60) Provisional application No. 63/081,946, filed on Sep. 23, 2020.

(51) Int. Cl.
 *G01B 5/08* (2006.01)
 *F16L 15/00* (2006.01)
(52) U.S. Cl.
 CPC .............. *G01B 5/08* (2013.01); *F16L 15/006* (2013.01)
(58) Field of Classification Search
 CPC ......... G01B 5/08; F16L 15/006; F16L 15/001
 See application file for complete search history.

(56) References Cited

U.S. PATENT DOCUMENTS

| | | | |
|---|---|---|---|
| 4,479,306 A | 10/1984 | Klementich | |
| 5,908,212 A | 6/1999 | Smith et al. | |
| 6,609,735 B1 | 8/2003 | DeLange et al. | |
| 8,628,120 B1 | 1/2014 | Clark et al. | |
| 9,261,207 B1 * | 2/2016 | Nations, Jr. | E21B 17/042 |
| 9,261,208 B1 * | 2/2016 | Nations, Jr. | E21B 17/042 |
| 11,047,413 B2 * | 6/2021 | Harvey | F16B 7/18 |
| 11,125,361 B2 * | 9/2021 | Dziekonski | F16L 15/06 |
| 11,396,962 B2 * | 7/2022 | Dunford | F16L 15/001 |
| 11,754,207 B2 * | 9/2023 | Dziekonski | F16L 15/06 285/333 |
| 11,795,981 B2 * | 10/2023 | Harvey | E21B 17/042 |
| 2004/0174017 A1 | 9/2004 | Brill et al. | |
| 2007/0214664 A1 | 9/2007 | Muradov et al. | |
| 2017/0314596 A1 * | 11/2017 | Harvey | F16B 7/0433 |
| 2020/0386351 A1 * | 12/2020 | Dunford | F16L 15/001 |
| 2021/0317856 A1 * | 10/2021 | Harvey | E21B 17/042 |
| 2022/0090902 A1 * | 3/2022 | Broussard | F16L 15/001 |
| 2023/0088330 A1 * | 3/2023 | Breen | E21B 17/042 |
| 2024/0018985 A1 * | 1/2024 | Harvey | E21B 17/042 |
| 2024/0052710 A1 * | 2/2024 | Owoeye | F16L 15/002 |

* cited by examiner

*Primary Examiner* — Yaritza Guadalupe-McCall
(74) *Attorney, Agent, or Firm* — Vorys, Sater, Seymour and Pease LLP

(57) ABSTRACT

A tubular member includes a pin end terminating in a pin end face, an external thread profile defined on an outer circumference of the pin end and terminating at a thread termination location axially offset from the pin end face, and an axial extension provided on the pin end and extending axially from the thread termination location to the pin end face, the axial extension defining a gauge surface for obtaining diameter measurements of the pin end. An angle of the gauge surface aligns with an angle of a root plane provided by the external thread profile.

19 Claims, 3 Drawing Sheets

PIPE PIN END WITH AXIAL EXTENSION

BACKGROUND

In the oil and gas industry, several types of tubing and pipe are used in exploration, completion, and production operations designed to locate and extract hydrocarbons from subterranean hydrocarbon-bearing formations. Typical types of oilfield tubing include drill pipe, casing (or liner), and production tubing. Relatively short pipe sections of 30 to 40 ft. in length are commonly coupled end-to-end to make long strings of interconnected pipes. Connected sections of drill pipe, for example, form a drill string used to deepen or work over the well. Connected sections of casing or liner pipe are used to encase the walls of a drilled wellbore and provide structural support for the well. And connected sections of production tubing are used to convey (transport) the subsurface hydrocarbon (e.g., oil or gas) reserves to the well surface.

Each of the different types of pipe has a threaded end configuration specially designed to meet its intended purpose as it structurally secures and seals the pipe ends together. Common threaded connections include a male threaded member or "pin end" at the end of a tubular section, which engages a female threaded member or "box end" at the end of an adjoining tubular section. In some applications, the pin ends of two adjacent pipes can be connected by being oppositely threaded into a coupling or box connector designed to join the two pipes.

During the manufacture of threaded pipes and tubulars, the diameter of the pipes at the pin end is periodically measured to ensure proper dimensions and quality control. Threading that extends along the entire pin end, however, can preclude an accurate diameter measurement.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to threaded tubulars and, more particularly, to designs and configurations for pin ends of threaded downhole tubulars and pipes.

Embodiments disclosed herein describe threaded tubular members having an external thread profile that helps facilitate accurate measurements of the pin end of the tubular member. One example tubular member includes a pin end having an outer circumference and terminating in a pin end face. An external thread profile may be defined on the outer circumference and terminates at a location axially offset from the pin end face. The pin end defines or otherwise provides an axial extension extending axially from the location to the pin end face, and a gauge surface may be defined on the axial extension that is substantially unobstructed to enable accurate measurements of the diameter of the pin end.

Figure 1:
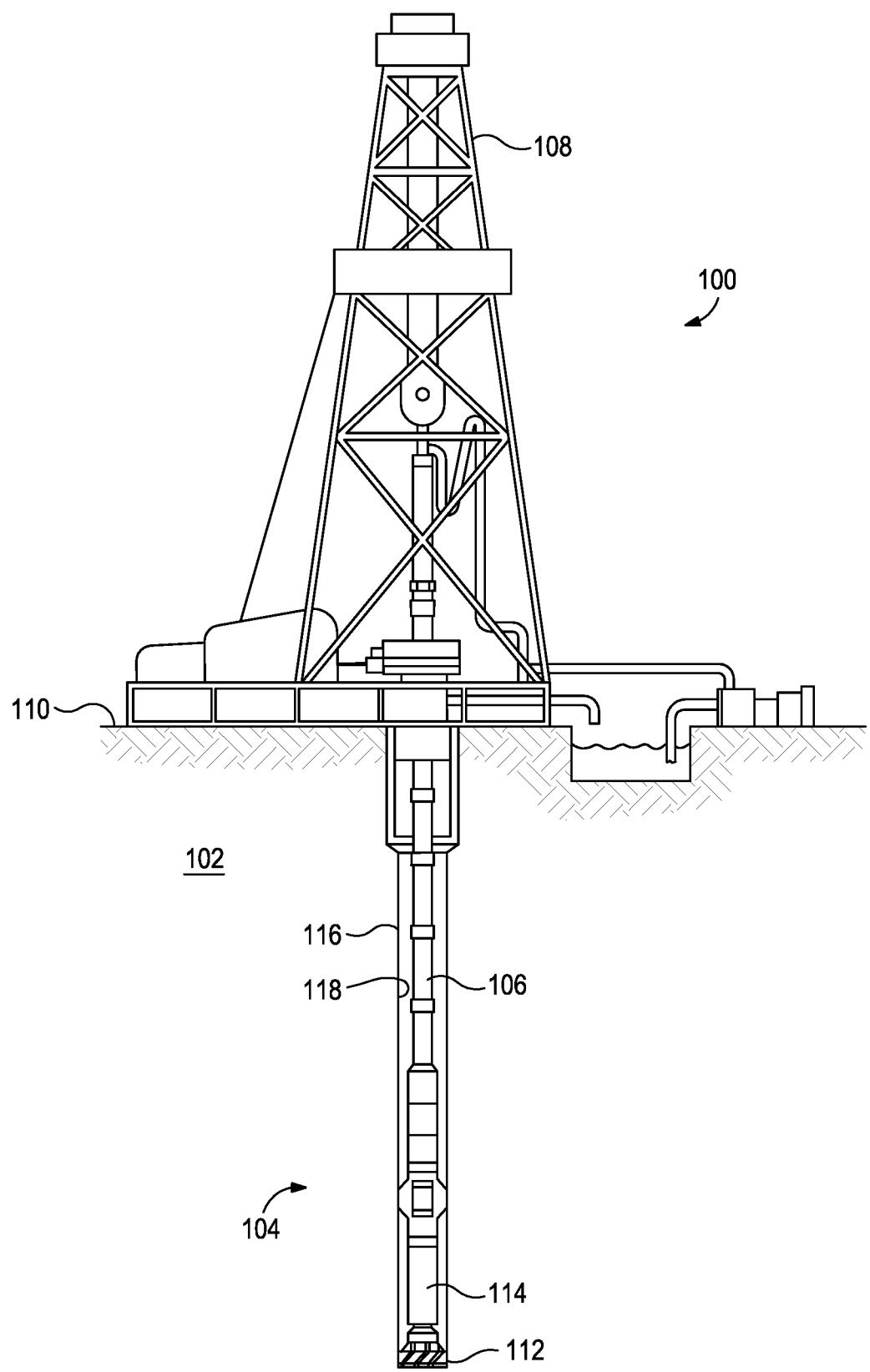
FIG. 1 is a schematic diagram of an example drilling system.

FIG. 1 is a schematic diagram of an example drilling system 100 that may incorporate the principles of the present disclosure. Boreholes may be created by drilling into the earth 102 using the drilling system 100. In the illustrated example, the drilling system 100 includes a bottom hole assembly (BHA) 104 positioned or otherwise arranged near the bottom of a drill string 106 extended into the earth 102 from a derrick 108 arranged at the surface 110.

The BHA 104 includes a drill bit 112 operatively coupled to the end of a tool string 114 that extends axially within a drilled wellbore 116. During operation, the drill bit 112 is rotated to grind and cut into the underlying rock formations and thereby progressively penetrate the earth 102 to create the wellbore 116. Once the wellbore 116 is drilled, the drill string 106 is removed and the wellbore 116 can then be lined with casing 118 (alternately referred to as "liner pipe") that is cemented into place within the wellbore 116 to support the walls of the wellbore 116 and prevent unwanted influx of fluids into the wellbore 116. After undertaking various downhole operations to "complete" the wellbore 116, production tubing (not shown) may be extended into the wellbore 116 and used to extract hydrocarbons (e.g., oil or gas) from subterranean hydrocarbon reserves.

The drill string 106, the casing 118, and the production tubing are each made up of multiple pipes (alternately referred to herein as "tubular members" or "tubulars") threadably connected together end-to-end. In some applications, the tubular members of the drill string 106, the casing 118, and the production tubing are connected end to end in a male/female relationship. In such applications, one pipe section provides a male threaded member or "pin end," which is threaded into a female threaded member or "box end" of an adjoining pipe section. In other applications, however, adjacent tubular members can be coupled by threading corresponding pin ends of each pipe into a coupling or box connector that defines internal threading configured to threadably receive the threading or thread profiles provided on the external surface of the pin ends.

Figure 2:
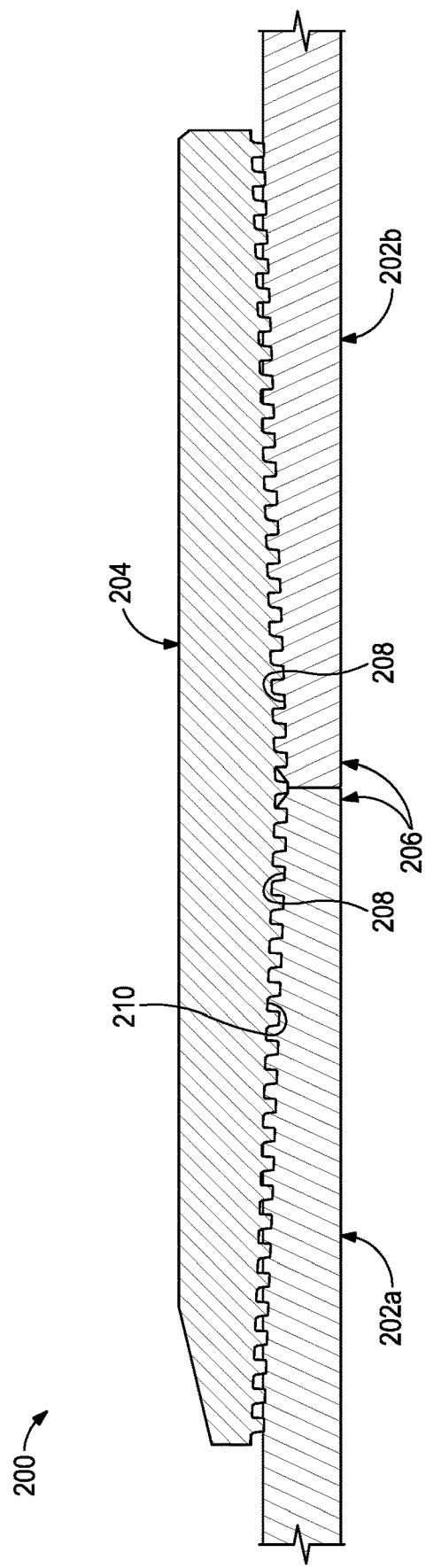
FIG. 2 is a cross-sectional side view of an example threaded connection that may incorporate the principles of the present disclosure.

FIG. 2 is a cross-sectional side view of an example threaded connection 200. The threaded connection 200 may include a first tubular member 202a coupled to a second tubular member 202b using a coupling 204 (alternately referred to as a "box connector"). The tubular members 202a,b may comprise any type of tubing, pipe, or tubulars commonly used in the oil and gas industry and capable of being threadably connected at one or both of their ends. Examples of the tubular members 202a,b suitable for the present disclosure include, but are not limited to, casing (or liner), drill pipe, production tubing, downhole tubular assemblies (e.g., a wellbore hanger, hydraulic fracturing tools, float equipment, air lock subs, cementing heads, casing subs, well control crossovers, etc.) and any combination thereof. Notwithstanding the foregoing, the principles discussed herein are not suitable only for the oil and gas industry, but may equally be applied to threadable pipes and tubulars used in other industries and applications, without departing from the scope of the disclosure.

In the illustrated embodiment, each tubular member 202a,b provides a corresponding pin end 206 that defines external threading 208. The coupling 204 defines internal threading 210 configured to receive and threadably engage the external threading 208 of each pin end 206. In some applications, the tubular members 202a,b may be threaded into the coupling 204 until the pin ends 206 meet at or near an axial center of the coupling 204. In other applications, however, the tubular members 202a,b may be threaded into the coupling 204 until the pin ends 206 engage an internal shoulder (not shown) or other internal structure provided within the coupling 204.

Figure 3:
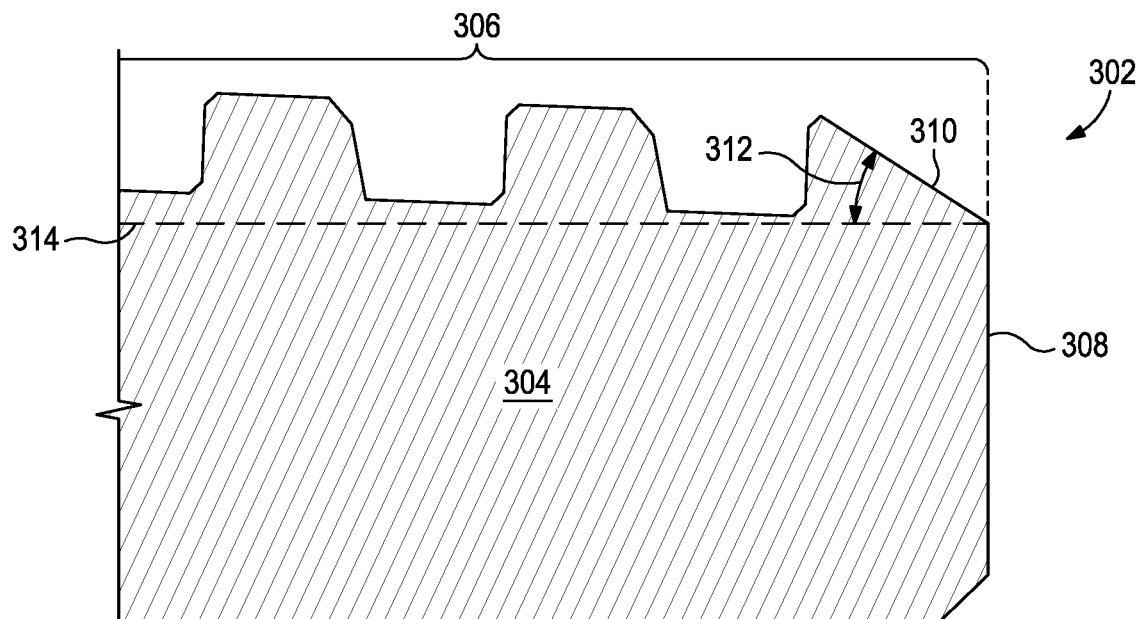
FIG. 3 is an enlarged cross-sectional side view of a prior art tubular member.

FIG. 3 is an enlarged cross-sectional side view of a prior art tubular member 302. More particularly, FIG. 3 depicts an enlarged cross-sectional side view of a pin end 304 of the tubular member 302. The tubular member 302 may be the same as or similar to either of the tubular members 202a,b of FIG. 2, and thus may comprise any type of tubing, pipe, or tubular commonly used in the oil and gas industry (or any other industry requiring threaded pipes) and capable of being threadably connected to another tubular member.

As illustrated, the tubular member 302 defines or otherwise provides an external thread profile 306 that extends along at least a portion of the pin end 304 and terminates at a pin end face 308. In some applications, the external thread profile 306 comprises a helical thread profile extending helically about the circumference of the pin end 304 and terminating at the pin end face 308.

As illustrated, the external thread profile 306 ends or terminates in an angled surface or chamfer 310 at the end of the pin end 304, and the chamfer 310 leads into the pin end face 308. The chamfer 310 is formed on the external thread profile 306 about the circumference of the pin end 304 and intersects the pin end face 308. The chamfer 310 provides an angled surface that helps the external thread profile 306 locate and threadably mate with a corresponding internal thread profile of a box end of an opposing tubular member or a connector (e.g., the connector 204 of FIG. 2). The chamfer 310 is defined or provided at an angle 312 offset from a plane or line 314 extending parallel to an inner surface 316 of the tubular member 302. The inner surface 316 may be parallel to a centerline of the tubular member 302. In some applications the angle 312 is about 30°.

During the manufacturing process of tubular members, such as the tubular member 302, it is often desirable to measure the diameter of the pin end 304 to ensure quality control. This measurement is conventionally done using a gauge measurement device, such as calipers or the like, which include opposing gauge arms (or points) that are positioned on opposite angular locations about the circumference of the pin end 304 and then adjusted to come into contact with the pin end 304 on the opposite angular locations. However, the presence of the thread profile 306 and the irregular chamfer 310 at the pin end face 308 makes it difficult to accurately measure or "control" the diameter of the pin end 304. More specifically, the angled and uneven surface of the chamfer 310 prevents accurate measurement of the diameter at the pin end 304 since there is no consistent flat (planar) surface about the circumference from which to accurately obtain a diameter measurement.

According to embodiments of the present disclosure, the end of the pin end of a tubular member may include an axial extension that does not include a thread profile, and may thereby provide a gauge surface suitable for obtaining accurate diameter measurements of the tubular member. As described below, the axial extension may extend axially from a location where the external thread profile terminates, thus providing the gauge surface as a substantially planar (albeit arcuate) surface unobstructed by portions of the external thread profile about the entire circumference of the pin end. Consequently, the gauge surface may provide an ideal location to obtain accurate diameter measurements of the tubular member, which may help improve measuring and control of the diameter during the manufacturing process.

Figure 4:
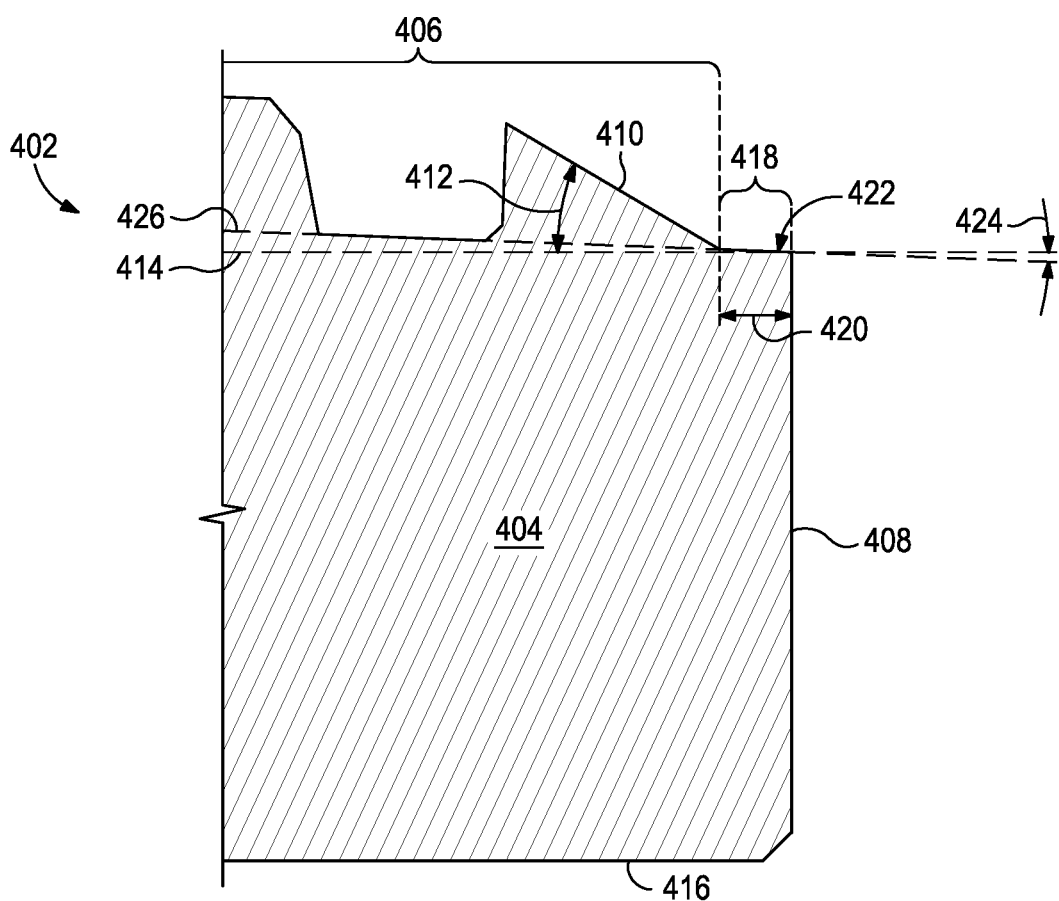
FIG. 4 is a cross-sectional side view of an example tubular member that incorporates one or more principles of the present disclosure.

FIG. 4 is a cross-sectional side view of an example tubular member 402 that incorporates one or more principles of the present disclosure. More particularly, FIG. 4 depicts an enlarged cross-sectional side view of a pin end 404 of the tubular member 402. Similar to the tubular member 302 of FIG. 3, the tubular member 402 may be the same as or similar to either of the tubular members 202a,b of FIG. 2, and may thus comprise any type of tubing, pipe, or tubular commonly used in the oil and gas industry (or any other industry requiring threaded pipes) and capable of being threadably connected to another tubular member.

As illustrated, the tubular member 402 defines or otherwise provides an external thread profile 406 that extends along a portion of the pin end 404. In some embodiments, the external thread profile 406 comprises a helical thread profile extending helically about the circumference of the pin end 404, but could alternatively comprise other types of thread profiles, without departing from the scope of the disclosure. The external thread profile 406 terminates prior to reaching the axial end of the pin end 404 where a pin end face 408 is provided. More specifically, the external thread profile 406 terminates at a location axially offset from the pin end face 408, referred to herein as the "thread termination location".

The external thread profile 406 may end or terminate in an angled surface or chamfer 410, similar in some respects to the chamfer 310 of FIG. 3. For example, the chamfer 410 is formed at the end of the external thread profile 406 and about the circumference of the pin end 404. Moreover, the chamfer 410 may be defined or provided at an angle 412 offset from a plane or line 414 extending parallel to an inner surface 416 of the tubular member 402, and the inner surface 416 may be parallel to a centerline of the tubular member 402. In some embodiments, the angle 412 may be about 30°, but may alternatively be more or less than 30°, such as ranging between about 15° and about 60°, without departing from the scope of the disclosure.

Unlike the tubular member 302 of FIG. 3, however, the tubular member 402 further provides an axial extension 418 (alternately referred to as a "pin nose") that extends axially from the thread termination location. More specifically, the axial extension 418 extends from the thread termination location where the external thread profile 406 terminates to the axial end of the pin end 404 where the pin end face 408 is located. In some embodiments, the axial extension 418 may exhibit an axial length 420 of about 0.1 inches, but could be more or less than 0.1 inches, without departing from the scope of the disclosure. For example, the axial length 420 may range between about 0.025 inches to about 0.25 inches. Having an axial length 420 between 0.025 inches to about 0.25 inches may prove advantageous in decreasing the likelihood of axial collapse or buckling of the tubular member 402, of which longer axial extensions might be susceptible.

The axial extension 418 may provide or otherwise define a gauge surface 422 extending about all or a portion of the outer circumference of the pin end 404. The gauge surface 422 may provide an arcuate (curved) but substantially flat (i.e., no external thread profile) surface that can advantageously accommodate a gauge measurement device (e.g., calipers) to accurately measure the diameter of tubular member 402 at the pin end 404. In contrast to the pin end 304 of FIG. 3, where the external thread profile 306 terminates at the pin end face 308, the external thread profile 406 of the pin end 404 terminates prior to the pin end face 408, thus providing a generally unobstructed and smooth curved surface where accurate diameter measurements can be obtained.

In some embodiments, the gauge surface 422 may comprise a tapered or angled surface. In such embodiments, the diameter of the pin end 404 at the gauge surface 422 may decrease in the axial direction toward the pin end face 408, thus resulting in a constantly changing diameter of the gauge surface 422 along the axial length 420. This may result in a conical or frustoconical axial extension 418. In some embodiments, the gauge surface 422 may extend from the external thread profile 406 at an angle 424 offset from the plane or line 414, which is parallel to the inner surface 416 and perpendicular to the pin end face 408. In such embodiments, for example, the angle 424 may range between about 1° and about 3° offset from the line 414, but could alternatively be less than 1° or more than 3°, without departing from the scope of the disclosure. In at least one embodiment, the angle 424 of the gauge surface 422 may align with the angle of a root plane 426 of the thread profile 406.

In other embodiments, however, the gauge surface 422 may extend from the external thread profile 406 to the pin end face 408 substantially parallel to or along the line 414, thus being parallel to the inner surface 416 of the tubular member 402. In such embodiments, the diameter of the gauge surface 422 may be the same along the axial length 420 and thereby provide a cylindrical portion of the pin end 404 having a constant diameter.

Incorporating or including the axial extension 418 on the pin end 404 may provide several advantages. For example, the gauge surface 422 provided by the axial extension 418 provides a location where more accurate diameter measurements of the pin end 404 may be obtained, which can result in improved control over the resulting thickness of the pin end face 408. Accordingly, a gauge measurement device, such as calipers or the like, may be arranged at the pin end 404 and the opposing gauge arms (or points) of the gauge measurement device may be positioned on opposite angular locations of the pin end 304. The opposing gauge arms may then be adjusted to come into contact with the gauge surface 422 at the opposite angular locations to obtain accurate diameter measurements of the pin end 404.

Moreover, having the axial extension 418 or "pin nose" at the pin end 404 provides a definitive torque stop, more torque and better bending and compression performance when mating with an opposing pin end or shoulder. Furthermore, as mentioned above, the relatively short axial length 420 of the axial extension 418 provides the benefits of accurate diameter measurement without increasing the likelihood of axial collapse or buckling of the tubular member 402, of which longer extensions might be susceptible.

The axial extension 418 also increases the volume of the material of the tubular member 402 at the center of the connection when assembled. More specifically, by adding the axial extension 418, the axial length of the pin end 404 is increased, which generates an additional volume of material at the center of the connection, which is absent from prior art tubular members, such as the tubular member 302 of FIG. 3. This may prove advantageous in providing space to accommodate excess thread compound, which may help prevent collapsing of the pin end 404 due to excess thread compound.

The axial extension 418 may also offset the pin position when assembled, which allows for differing levels of interference when the tubular member 404 is assembled with a standard API connection. More specifically, the amount of radial thread interference may be customized between the tubular member 404 and an opposing box while still accepting an API buttress pin and staying within the same radial interference parameters that a typical buttress connection would fit within under the makeup criteria established as acceptable for API buttress. The axial extension 418 allows for a reduction in hoop stress for the tubular member 404, as compared to API buttress. This decreases the likelihood of hydrogen embrittlement, which is a common failure mechanism for API connections, yet it still allows for a standard API buttress connector to be interchanged when necessary for various accessories.

Lastly, the tapering of the gauge surface 422 allows for an increased diameter of the pin end 404 without interference (and thus galling) of the connection during assembly. More specifically, the tapered gauge surface 422 may be advantageous in providing clearance during the stabbing and assembly process. Moreover, the axial extension 418 may allow for the diameter to be maintained closer to the thread root plane 424 than what would otherwise be possible in manufacturing.

Embodiments disclosed herein include:

A. A tubular member that includes a pin end terminating in a pin end face, an external thread profile defined on an outer circumference of the pin end and terminating at a thread termination location axially offset from the pin end face, and an axial extension provided on the pin end and extending axially from the thread termination location to the pin end face, the axial extension defining a gauge surface for obtaining diameter measurements of the pin end, wherein an angle of the gauge surface aligns with an angle of a root plane provided by the external thread profile.

B. A method of coupling a tubular member to a box end, the method including the steps of inserting a pin end of the tubular member into the box end, the box end defining an internal thread profile and the pin end terminating in a pin end face and including an external thread profile defined on an outer circumference of the pin end and terminating at a thread termination location axially offset from the pin end face, and an axial extension provided on the pin end and extending axially from the thread termination location to the pin end face, the axial extension defining a gauge surface for obtaining diameter measurements of the pin end, wherein an angle of the gauge surface aligns with an angle of a root plane provided by the external thread profile. The method further including rotating one of the tubular and the box end relative to the other of the tubular and the box end and thereby engaging the internal and external thread profiles and advancing the pin end into the box end.

C. A method of measuring a diameter of a tubular member, the method including positioning a gauge measurement device adjacent a pin end of the tubular member, the pin end terminating in a pin end face and including an external thread profile defined on an outer circumference of the pin end and terminating at a thread termination location axially offset from the pin end face, and an axial extension provided on the pin end and extending axially from the thread termination location to the pin end face and thereby defining a gauge surface, wherein an angle of the gauge surface aligns with an angle of a root plane provided by the external thread profile. The method further including arranging the gauge measurement device on the pin end by positioning arms of the gauge measurement at opposite angular locations about an outer circumference of the gauge surface, and adjusting a position of the arms to come into contact with the gauge surface and thereby obtaining a measurement of the diameter of the pin end at the gauge surface.

Each of embodiments A, B, and C may have one or more of the following additional elements in any combination: Element 1: wherein the tubular member is selected from the group consisting of casing, liner, drill pipe, production tubing, a downhole tubular assembly, and any combination thereof. Element 2: wherein the external thread profile terminates in a chamfer extending about at least a portion of the outer circumference. Element 3: wherein the chamfer extends at an angle offset from a line parallel to an inner surface of the tubular member. Element 4: wherein the gauge surface is provided about the outer circumference along an axial length ranging between about 0.025 inches and about 0.25 inches. Element 5: wherein a diameter of the gauge surface varies along an axial length of the axial extension. Element 6: wherein the gauge surface extends at an angle offset from horizontal and aligning with an angle of a root plane provided by the external thread profile. Element 7: wherein the angle offset from horizontal ranges between about 1° and about 3°. Element 8: wherein the gauge surface defines a conical surface extending from the external thread profile. Element 9: wherein a diameter of the gauge surface remains constant along an axial length of the axial extension. Element 10: wherein the thread profile is helical.

Element 11: wherein the tubular member is a first tubular member and the box end forms part of a second tubular member. Element 12: wherein the box end forms part of a coupling. Element 13: further comprising helping locate the box end with the axial extension. Element 14: wherein the tubular member is selected from the group consisting of casing, liner, drill pipe, production tubing, a downhole tubular assembly, and any combination thereof. Element 15: wherein a diameter of the gauge surface varies along an axial length ranging between about 0.025 inches and about 0.25 inches. Element 16: wherein a diameter of the gauge surface remains constant along an axial length of the axial extension.

By way of non-limiting example, exemplary combinations applicable to A, B, and C include: Element 2 with Element 3; Element 5 with Element 6; Element 5 with Element 7; and Element 5 with Element 8.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A tubular member, comprising:
   a pin end terminating in a pin end face;
   an external thread profile defined on an outer circumference of the pin end and terminating at a thread termination location axially offset from the pin end face; and
   an axial extension provided on the pin end and extending axially from the thread termination location to the pin end face, the axial extension defining a gauge surface for obtaining diameter measurements of the pin end,
   wherein an angle of the gauge surface aligns with an angle of a root plane provided by the external thread profile.

2. The tubular member of claim 1, wherein the tubular member is selected from the group consisting of casing, liner, drill pipe, production tubing, a downhole tubular assembly, and any combination thereof.

3. The tubular member of claim 1, wherein the external thread profile terminates in a chamfer extending about at least a portion of the outer circumference.

4. The tubular member of claim 3, wherein the chamfer extends at an angle offset from a line parallel to an inner surface of the tubular member.

5. The tubular member of claim 1, wherein the gauge surface is provided about the outer circumference along an axial length ranging between about 0.025 inches and about 0.25 inches.

6. The tubular member of claim 1, wherein a diameter of the gauge surface varies constantly along an axial length of the axial extension.

7. The tubular member of claim 6, wherein the diameter of the gauge surface decreases in an axial direction toward the pin end face.

8. The tubular member of claim 6, wherein the angle of the root plane ranges between about 1° and about 3° offset from horizontal.

9. The tubular member of claim 6, wherein the gauge surface defines a conical surface extending from the external thread profile.

10. The tubular member of claim 1, wherein a diameter of the gauge surface remains constant along the axial extension.

11. A method of coupling a tubular member to a box end, comprising:
    inserting a pin end of the tubular member into the box end, the box end defining an internal thread profile and the pin end terminating in a pin end face and including:
        an external thread profile defined on an outer circumference of the pin end and terminating at a thread termination location axially offset from the pin end face; and
        an axial extension provided on the pin end and extending axially from the thread termination location to the pin end face, the axial extension defining a gauge surface for obtaining diameter measurements of the pin end, wherein an angle of the gauge surface aligns with an angle of a root plane provided by the external thread profile; and
    rotating one of the tubular and the box end relative to the other of the tubular and the box end and thereby engaging the internal and external thread profiles and advancing the pin end into the box end.

12. The method of claim 11, wherein the tubular member is a first tubular member and the box end forms part of a second tubular member.

13. The method of claim 11, wherein the box end forms part of a coupling.

14. The method of claim 11, further comprising locating the box end with the axial extension.

15. The method of claim 11, wherein the tubular member is selected from the group consisting of casing, liner, drill pipe, production tubing, a downhole tubular assembly, and any combination thereof.

16. The method of claim 11, wherein a diameter of the gauge surface varies constantly along an axial length of the axial extension.

17. The method of claim 11, wherein a diameter of the gauge surface remains constant along an axial length of the axial extension.

18. The method of claim 11, wherein an axial length of the axial extension ranges between about 0.025 inches and about 0.25 inches.

19. A method of measuring a diameter of a tubular member, comprising:
    positioning a gauge measurement device adjacent a pin end of the tubular member, the pin end terminating in a pin end face and including:
        an external thread profile defined on an outer circumference of the pin end and terminating at a thread termination location axially offset from the pin end face; and
        an axial extension provided on the pin end and extending axially from the thread termination location to the pin end face and thereby defining a gauge surface, wherein an angle of the gauge surface aligns with an angle of a root plane provided by the external thread profile;
    arranging the gauge measurement device on the pin end by positioning arms of the gauge measurement at opposite angular locations about an outer circumference of the gauge surface; and
    adjusting a position of the arms to come into contact with the gauge surface and thereby obtaining a measurement of the diameter of the pin end at the gauge surface.

* * * * *